US005467148A

United States Patent [19]
Conway

[11] Patent Number: 5,467,148
[45] Date of Patent: Nov. 14, 1995

[54] EYEWEAR HAVING INTERCHANGEABLE LENSES

[75] Inventor: Simon M. Conway, Lima, N.Y.

[73] Assignee: Bausch & Lomb Incorporated, Rochester, N.Y.

[21] Appl. No.: 148,480

[22] Filed: Nov. 8, 1993

[51] Int. Cl.[6] ............................ G02C 1/00; G02C 5/02
[52] U.S. Cl. ............................ 351/85; 351/86; 351/103; 351/124; 351/154
[58] Field of Search ............................ 351/41, 42, 44, 351/47, 52, 57, 59, 60, 63, 83, 84, 85, 86, 88, 92, 94, 96, 103, 105, 106, 109, 124, 128, 132, 133, 138, 140, 149, 154, 178, 158; 2/441, 444

[56] References Cited

U.S. PATENT DOCUMENTS

| | | | |
|---|---|---|---|
| 2,284,630 | 6/1942 | Banks | 351/86 |
| 2,519,852 | 8/1950 | Ring | 351/63 |
| 2,529,110 | 11/1950 | Splaine | 351/60 |
| 2,655,835 | 10/1953 | Salierno | 351/140 X |
| 2,781,693 | 2/1957 | Brumby | 351/85 |
| 2,831,393 | 4/1958 | Bennett | 351/140 X |
| 3,702,217 | 11/1972 | Page | 351/106 |
| 4,176,921 | 12/1979 | Matthias | 351/106 |
| 4,730,915 | 3/1988 | Jannard | 351/47 |
| 4,799,781 | 1/1989 | Weber | 351/86 |
| 4,802,753 | 2/1989 | Lhospice | 351/88 |
| 4,834,523 | 5/1989 | Porsche | 351/57 |
| 4,951,322 | 8/1990 | Lin | 351/138 X |
| 5,189,447 | 2/1993 | Oleson | 351/121 |
| 5,257,050 | 10/1993 | Wiedner | 351/86 |

FOREIGN PATENT DOCUMENTS

| | | |
|---|---|---|
| 0262020 | 3/1988 | European Pat. Off. . |
| 0516883 | 12/1992 | European Pat. Off. . |
| 2458089 | 12/1980 | France . |

*Primary Examiner*—William L. Sikes
*Assistant Examiner*—David R. Parsons
*Attorney, Agent, or Firm*—Salvatore P. Pace

[57] ABSTRACT

Eyewear frames are provided having a pair of interchangeable lenses wherein each lens has a pair of oppositely disposed sidewardly extending projections. The distal projections fit within recess areas on the distal ends of the top frame and proximate projections are locked into place over the nose area by a movable nose bridge.

15 Claims, 2 Drawing Sheets

5,467,148

EYEWEAR HAVING INTERCHANGEABLE LENSES

BACKGROUND OF THE INVENTION

1. Field of the Invention

The present invention relates to eyewear having a pair of interchangeable lenses.

2. Description of the Art

Eyewear, such as sunglasses or spectacles, are worn during a wide variety of activities and must be capable of meeting a wide variety of consumer demands. Recently, sunglasses have been developed having interchangeable lenses or lens assemblies permitting simple replacement of the lenses. Generally these lenses are unitary lenses and are made from a plastic material such as polycarbonate. For those engaged in active sports, the lenses are replaced at the wearer's option depending on the lighting conditions. For example, a dark lens or reflective lens may be useful for bright sunlight while a yellow or amber lens may be used for early morning or late evening activities, such as jogging.

Further, lens replacement may be desirable for changing various vision correction lenses to modify the lenses for indoor or outdoor use. For example, one set of lenses could be prescription sunglass lenses for outdoor use while the replacement lenses could be clear prescription lenses for indoor use. The idea of eyewear with interchangeable lenses may also be appealing to some far-sighted persons who may object to bifocals and would prefer to change the lens in the frame for near or far vision applications. In this embodiment, one set of prescription lenses would be for reading while the replacement set of lenses would be used for driving.

Finally, with eyewear being made in a wide variety of colors, designs and shapes, the lenses and/or frames can be modified by those interested solely in style. One set of lenses may be placed in a variety of frames to provide color coordination with the wearer's attire.

While eyewear with replaceable lenses has been known for many years, recent commercial interest has been directed to unitary or single-paned lenses of the wrap-around variety. Eyewear having a pair of interchangeable lenses have also been known for many years but has met with limited commercial success. Many of the prior dual lens systems have had significant short comings in that they are generally of complex mechanical structure making them expensive to manufacture and/or difficult to use. For example, many of these designs have required the use and removal of fasteners which may require tools. Other prior systems require substantial deformation of the lens or frame making insertion and removal difficult. Further, these prior systems are often too fragile for use in active sports activities such as skiing or volleyball with a tendency for easy lens loss.

Thus, the present invention is directed to eyewear having a pair of interchangeable lenses which are inexpensive to manufacture, easy to use and sturdy enough for use in active sports activities.

SUMMARY OF THE INVENTION

The present invention provides eyewear having interchangeable lenses comprising a pair of lenses each lens having a rim around its peripheral edge, each of the rims having a pair of projections extending outwardly from opposite sides thereof defining a distal projection and a proximate projection, a top frame having a pair of lens receiving sections and a bearing member between the receiving sections, each of the sections including a downwardly opened groove for removably receiving the upper edge of the rims and a recess area toward its distal end to accept one of the pair of projections, a bridge having an inverted generally U-shaped member and a connecting element, the U-shaped member having sidewardly opened grooves on opposite edges thereof for receiving the side edge of each of the rims, and rearwardly extending temples pivotally connected to opposite ends of the top frame, wherein the bridge moves from a first position which engages the bottom edge of the proximate projection of each of the lenses and a second position which release the bottom edge of the proximate projection.

In another embodiment of this invention, lenses with integral projections, such as plastic lenses, can be used in the absence of rims.

DETAILED DESCRIPTION OF THE INVENTION

Figure 1:
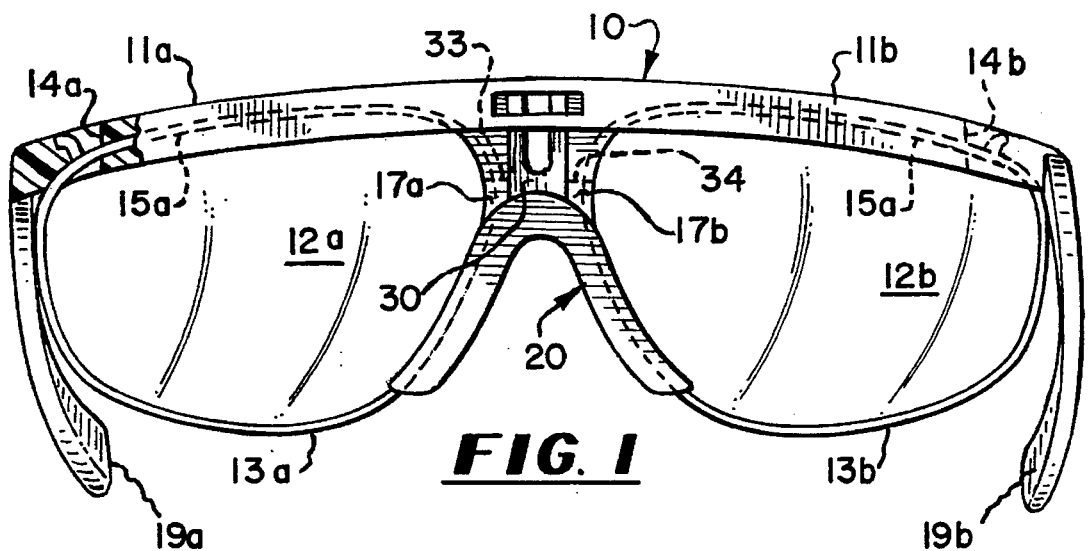
FIG. 1 is a rear view of an eyewear frame having interchangeable lenses mounted therein.
Figure 2:
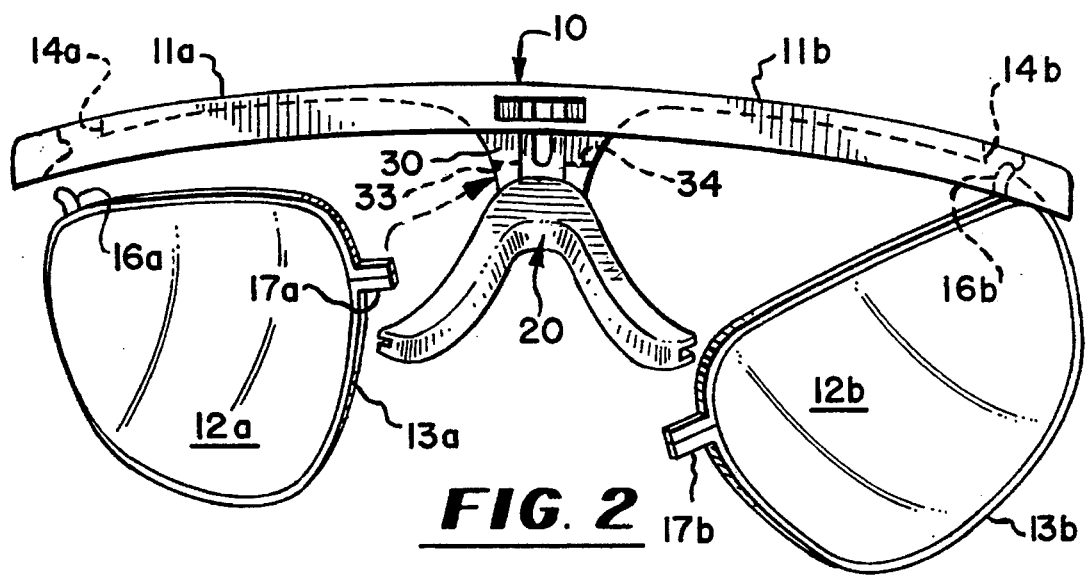
FIG. 2 is a rear view of the eyewear frame shown in FIG. 1 with the lenses partially removed.
Figure 3:
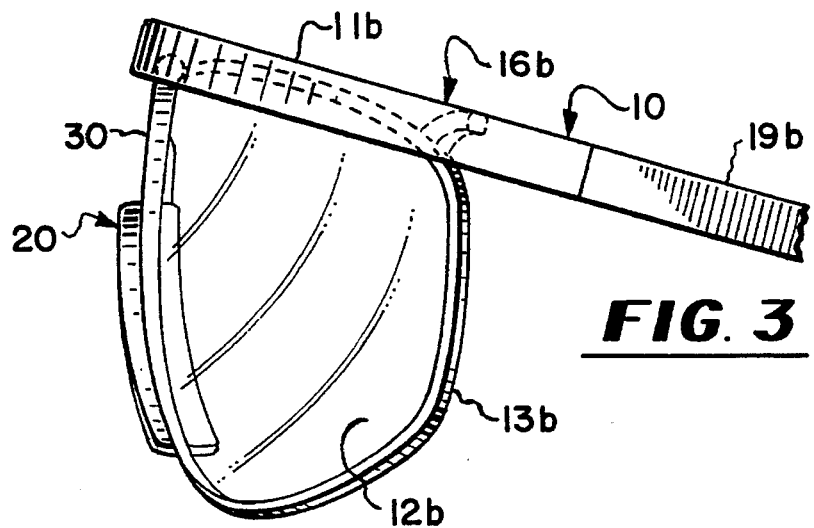
FIG. 3 is a side view of the eyewear frame shown in FIG. 1.

Referring to the FIGS., and in particular FIGS. 1 and 2, an eyewear frame is shown with top frame 10 having two lens receiving sections 11a and 11b, two lenses 12a and 12b, two temples 19a and 19b, and nose bridge 20. Viewing the top frame 10 from the rear, each lens receiving section (11a and 11b) has a distal end near the temple and a proximate end near nose bridge 20. Lenses 12a and 12b have corresponding distal sides and proximate sides. Lens receiving sections 11a and 11b have elongated grooves 15a and 15b (shown by dotted lines) open downwardly on the bottom edge of top frame 10 for receiving the top edge of lenses 12a and 12b, respectively. As shown in FIG. 2, lenses 12a and 12b have rims 13a and 13b surrounding the peripheral edge of each of the lenses. Rims 13a and 13b have substantially sidewardly extending projections 16a, 16b, 17a and 17b on opposite ends of rims 13a and 13b, respectively. Rim 13a has projection 16a on its distal side extending outward toward temple 19a and projection 17a on its proximate side extending inward toward nose bridge 20. Likewise, rim 13b has projection 16b on its distal side extending outward toward temple 19b and projection 17b on its proximate side. However, FIG. 3 best illustrates projection 16b which is shown by dotted lines within the distal end of receiving section 11b.

Receiving sections 11a and 11b each have recess areas 14a and 14b on their distal or hinge sides for receiving projections 16a and 16b. Recess areas 14a and 14b can be notches or slots of approximately equal or slightly greater size than projections 16a and 16b to closely fit and accept projections 16a and 16b. Recesss areas 14a and 14b can also have any suitable means for holding projections 16a and 16b in position but which will allow easy insertion and removal. In a preferred embodiment, projections 16a and 16b are arcuately shaped and can slide onto a bearing support or lug (shown as support 71 in FIG. 7) which is incorporated into recess areas 14a and 14b.

While lenses 12a and 12b are shown here in rims 13a and 13b, projections 16a, 16b, 17a and 17b can also be integrally formed with the lenses 12a or 12b or can be affixed directly to the lenses using a suitable fastener or adhesive. Preferably, plastic lenses will have projections molded or cut integrally with the lens.

Figure 7:
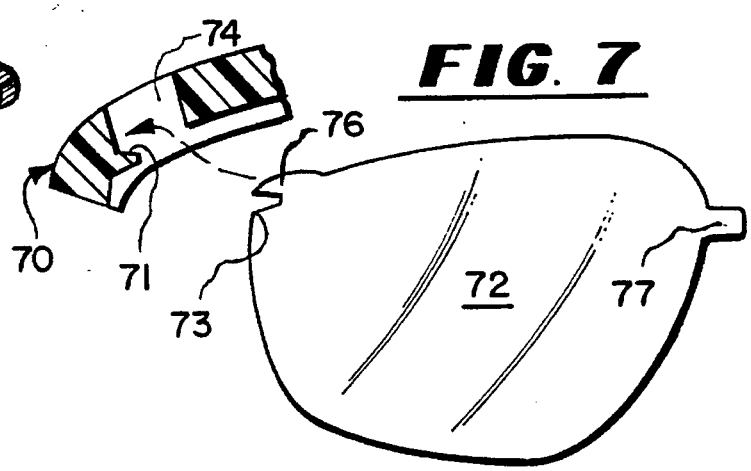
FIG. 7 is a front view of an individual lens and partial top frame of another embodiment of the present invention.

For example, FIG. 7 illustrates a preferred plastic lens embodiment wherein lens 72 has generally oppositely disposed projections 76 and 77 as shown. Partial view of top frame 70 has support 71 for bearing projection 76. In this embodiment, the recess area 74 comprises an opening through top frame 70 which will expose support 71 and visually aid insertion and removal of projection 76. More preferably, brace 73 is positioned below projection 76 to secure lens 72 into top frame 70 by accepting and locking top frame support 71 between projection 76 and bracing member 73. As is readily evident, the other lens in the eyewear frame would have the same (mirror image) configuration as lens 72 shown in FIG. 7.

The lenses used herein can be made from any suitable lens material such as optical quality glass or plastic and can be colored or clear, plano or vision corrected (prescription). Colored lenses are typically employed for normal sunglass applications while vision corrected lenses are typically employed to correct vision. If the lenses are plastic, it is preferred the lenses be made of a suitable optical quality plastic material such as polycarbonate, CR-39 (allyl diglycol carbonate), or the like. The choice of the lenses is substantially dependent on the desired use.

When rims are employed such as rims 13a and 13b, best shown in FIG. 2, a suitable metallic wire or plastic rim material can be employed. If plastic is chosen, suitable plastics include the materials described below for top frame 10. Preferably, rims 13a and 13b will be used when glass lenses are employed and will be made from a suitable metal or metal alloy typically employed in eyewear frames. Illustrated examples of such materials include, but are not limited to, nickel, copper, stainless steel, titanium and mixtures or alloys thereof. Such materials are well known in the art. Rims 13a and 13b can independently be comprised of either two individual elements or a single element shaped to conform to the shape of lenses 12a and 12b and connected by suitable fasteners or adhesives. Alternatively, rims 13a and 13b can be each comprised of a single preshaped or molded element in which the lenses can be simply snapped into place. Projections 16a, 16b, 17a and 17b can be integral with the wire, attached by suitable fasteners, or brazed or welded to rims 13a and 13b. Preferably, as shown in FIG. 2, rims 13a and 13b will each be a single wire conforming to the shape of the lenses and secured at its end with a fastener, such as a screw or rivet (not shown), at projections 17a and 17b, respectively.

Top frame 10 may also be made from metal, metal alloys or plastics. However, top frame 10 is preferably made from a moldable thermoformed plastic material, including but not limited to polyamides; polycarbonates; cellulose acetates, butyrates, and proprionates; and polymers or copolymers thereof.

Figure 4:
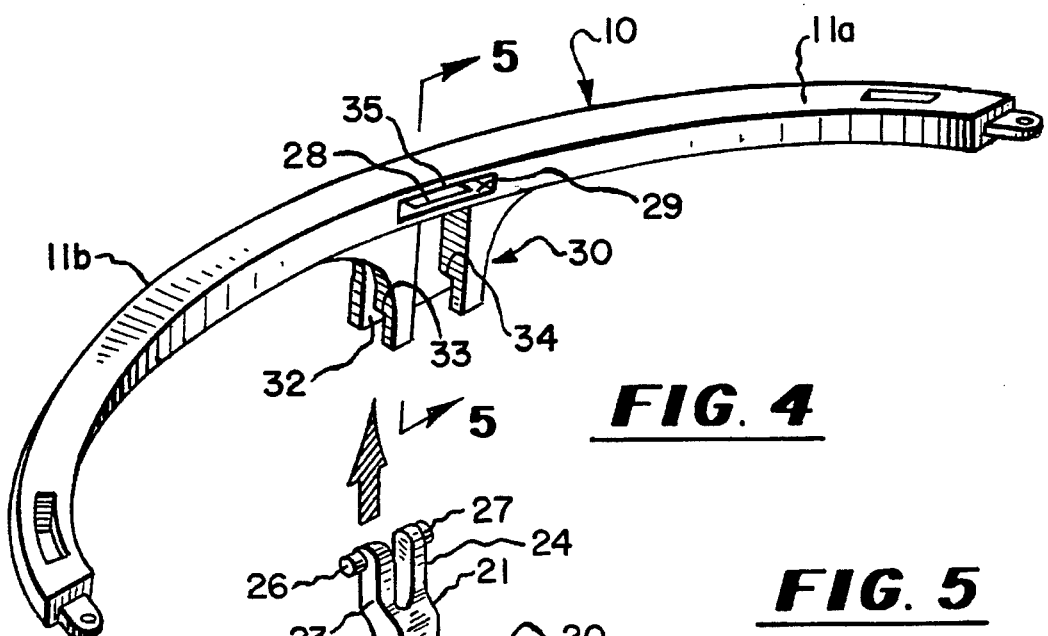
FIG. 4 is a left rear perspective view of the top frame and unengaged nose piece of the eyewear frame shown in FIG. 1.

FIG. 4 is a rear perspective view of top frame 10 which includes bearing member 30 which is attached to top frame 10 at a central location between lens receiving sections 11a and 11b. Bearing member 30 is preferably integral with top frame 10 and is an extension of top frame 10 including the continuation of the elongated grooves 15a and 15b of lens receiving sections 11a and 11b around its sides as shown. Bearing member 30 can also be an independent frame element which is attached to top frame 10 by any conventional means.

Bearing member 30 has sidewardly open grooves 32a and 32b and a receiving aperture which continues up through vertical opening 28. Vertical opening 28 can be seen through horizontal opening 35 which extends from vertical opening 28 through the back of top frame 10 in an aperture having an inverted "L" configuration. Ledge 29 extends horizontally on three sides from vertical opening 28. Top shoulders 33 and 34 are positioned on opposite sides of bearing member 30 and are used as stops to secure to top edge of projections 17a and 17b. Alternatively, rather than two shoulders, top shoulders 33 and 34 can be a single shoulder running horizontally along bearing member 30 (not shown) to stop and secure projections 17a and 17b. Other modifications readily apparent to a skilled artisan may also be employed. For example, bottom shoulders can also be employed (not shown) which will secure projections 17a and 17b between top shoulders 33 and 34 and the bottom shoulders.

Nose bridge 20 is also shown in FIG. 4 in the unengaged position. Nose bridge 20 has an inverted generally U-shaped member 22 attached to a connecting member 21 and has elongated groove 25 which is open sidewardly and runs inwardly from each distal end of U-shaped member 22. Inverted generally U-shaped member 22 fits over the wearer's nose as is common with eyewear and is typically made from a flexible thermoplastic or rubber-like material. Groove 25 has a width sufficient to accept the proximate or inside side edges of lenses 12a and 12b or rims 13a and 13b. Connecting element 21, which is also made from a flexible material, runs from generally U-shaped member 22 vertically in order to fit up into top frame 10 and has legs 23 and 24 each of which have outwardly extending tabs 26 and 27.

Figure 5:
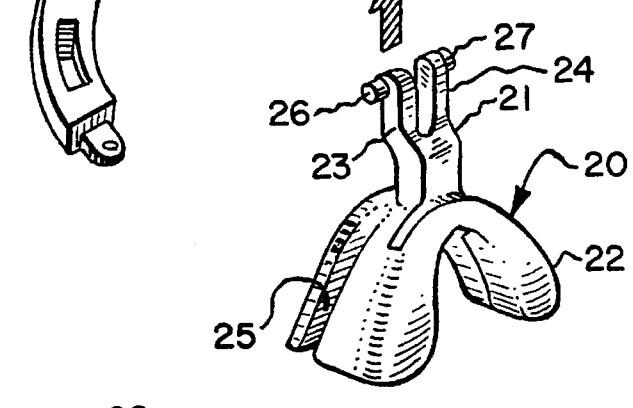
FIG. 5 is a partial sectional view taken along lines 5—5 of the top frame shown in FIG. 4.
Figure 5:
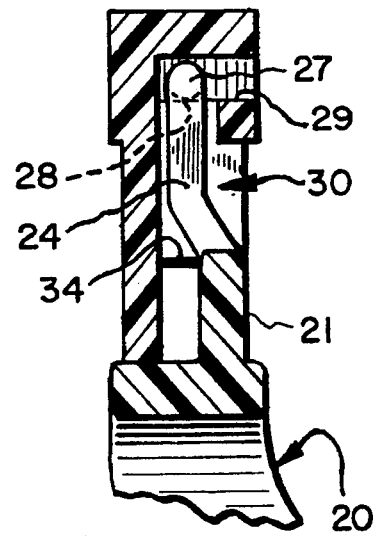

As shown in FIGS. 4 and 5, connecting member 21 slides up into the vertical aperture 32 in bearing member 30 by moving projections 26 and 27 inward to fit within the horizontal distance between the inside walls of sidewardly open groove 32. Legs 23 and 24 which support projections 26 and 27, respectively, allow projections 26 and 27 to be moved inwardly by squeezing together legs 23 and 24. Once slid up through opening 28, projections 26 and 27 return to their normal position and rest upon ledge 29. Alternatively, notches (not shown) can be used in place of ledge 29 to receive projections 26 and 27 in a conventional male/female interfit. Further, nose bridge 20 can be interchangeable.

Figure 6:
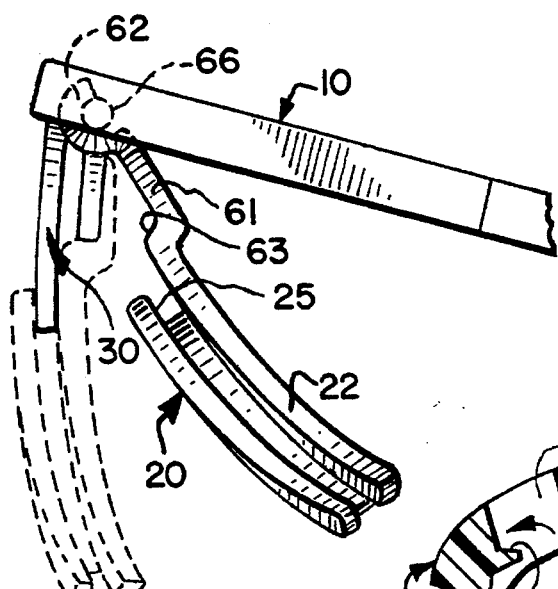
FIG. 6 is a partial sectional side view of an alternative embodiment of the top frame and nose bridge.

Other means of attachment which allow nose bridge 20 to be movable from bearing member 30 can be employed. For example, FIG. 6 illustrates another embodiment of the invention wherein bearing pin 66 is attached to top frame 10 as shown. Generally S-shaped connecting member 61 is pivotally attached to bearing pin 66 using the top hook-shaped element 62 of generally S-shaped connecting member 61. In this embodiment, connecting element 61 has a forwardly extending protrusion 63 which abuts the bottom edge of projections 17a and 17b when nose bridge 20 is positioned against bearing member 30. Finally, nose bridge 20 can also be permanently attached to top frame 10 (not shown) being molded as an integral component of top frame During insertion and removal, lenses 12a and 12b, with or without rims 13a and 13b, are inserted into top frame 10 by placing projections 16a and 16b into recess areas 14a and 14b. Nose bridge 20 is moved away from bearing member 30 (see FIG. 5) and projections 17a and 17b are pressed against top shoulders 33 and 34 of bearing member 30. Nose bridge 20 is swung back against bearing member 30 with the top edge of the generally U-shaped member 22 positioned beneath the bottom edge of projections 17a and 17b. When nose bridge 20 is properly positioned against bearing member 30, projections 17a and 17b are locked into position between U-shaped member 22 and top shoulders 33 and 34 thereby locking lenses 12a and 12b into top frame 10. Nose bridge 20 is held against bearing member 30 when the inside or proximate sides of lenses 12a and 12b are within sidewardly open grooves 32a and 32b. Frictional connections or other interfits (not shown) can also be used to hold nose bridge 20 against bearing member 30.

In order to remove lenses 12a and 12b from top frame 10, nose bridge 20 is moved away from bearing member 30 preferably by squeezing nose bridge 20 until elongated groove 25 is free of the proximate sides of lenses 12a and 12b and pulling nose bridge 20 away from the front of bearing member 30. Projections 17a and 17b are pulled away from top shoulders 33 and 34 and projections 16a and 16b are slid outward from recess areas 14a and 14b. If nose bridge 20 is permanently affixed to top frame 10, it will be made from a flexible material which will allow it to be forcibly moved away from bearing member 30 to insert or remove projections 17a and 17b and then will spring back to its normal position.

The present invention is not limited by the Figures set forth herein or the embodiments specifically disclosed above. It should be understood that the scope of the invention includes all modifications, variations and equivalents which fall within the scope of the attached claims.

What is claimed is:

1. Eyewear having interchangeable lenses comprising
   (a) a pair of lenses, each lens having an inward extending projection and an outward extending projection extending substantially sidewardly from opposite sides thereof,
   (b) a top frame having a pair of lens receiving sections, each of said sections having a downwardly opened elongated groove on its bottom edge for removably receiving the upper edge of one of said lenses and a recess area near the distal ends of said groove for accepting and holding said outward extending projection, and
   (c) a nose bridge centrally attached to said top frame and having means for releasably securing said inward extending projection, said nose bridge being movable with respect to said top frame to facilitate securing and releasing of said inward extending projection in said nose bridge.

2. Eyewear frame of claim 1 additionally comprising rearwardly extending temples pivotally attached to distal ends of said top frame.

3. Eyewear of claim 1 wherein said outward extending projections are arcuately shaped to interfit within a complimentary shaped recess area within said top frame.

4. Eyewear of claim 1 wherein said recess area has a support member and each of said lenses includes an outward extending brace positioned below said outward extending projection, said outward extending projection and outward extending brace forming a notch therebetween for receiving and locking therein said support member.

5. Eyewear of claim 1 wherein said nose bridge is comprised of a vertically extending connecting member attached to an inverted generally U-shaped member and said connecting member is attached to a bearing member within said top frame.

6. Eyewear of claim 5 wherein said vertically extending connecting member has oppositely extending legs, each of said legs having an outwardly extending projection.

7. Eyewear of claim 6 wherein said projection rests upon a bearing ledge within said top frame when said nose bridge is attached to said top frame.

8. Eyewear of claim 1 wherein said top frame is a moldable thermoformed plastic material.

9. Eyewear of claim 1 wherein said lenses are made from an optical quality plastic material.

10. Eyewear of claim 1 wherein said nose bridge is comprised of an inverted generally U-shaped connecting member having means for supporting which can be positioned to abut said inwardly extending projections.

11. Eyewear having interchangeable lenses comprising
   a pair of lenses each having a rim around its peripheral edge, each of said rims having a pair of projections extending outwardly from opposite sides thereof defining a distal projection and a proximate projection,
   a top frame having a pair of lens receiving sections and a bearing member between said receiving sections having means for releasably securing said proximate projections on each lens, each of said sections including a downwardly opened groove for removably receiving the upper edge of said rims and a recess area near its distal end to engage said distal projection,
   a bridge having an inverted generally U-shaped member and a connecting member attaching said U-shaped member to said top frame, said U-shaped member having sidewardly opened grooves on opposite sides thereof for receiving the edge of each of said rims, and
   rearwardly extending temples pivotally connected to opposite ends of said top frame,
   wherein said bridge is movable from a first position which secures the bottom edge of said proximate projection on each of said rims to a second position which releases the bottom edge of said proximate projection and allows removal of said lenses from said top frame.

12. The eyewear of claim 11 wherein said rims are attached to said lenses by means of a fastener located at said proximate projection.

13. The eyewear of claim 11 wherein said lenses are glass.

14. The eyewear of claim 11 wherein said connecting member is pivotally attached to said top frame and is pivotable inwardly from a vertical position substantially perpendicular to said top frame.

15. Eyewear having a top frame, temples and a pair of interchangeable lenses comprising
   (a) sidewardly extending projections on opposite ends of said lenses to provide a distal projection and a proximate projection on each lens,
   (b) recess areas at the distal ends of said top frame for receiving said distal projection of each lens, and a downwardly opened elongated groove on bottom edge of said top frame for removably receiving upper edges of said lenses,
   (c) a movable nose bridge centrally attached to said top frame by a connecting member affixed to an inverted generally U-shaped member, (d) a bearing member centrally attached to said top frame, said bearing member having means for supporting the top edge of each of said proximate projections, wherein said nose bridge is movable from a first position allowing insertion of said distal projection and said lenses into said top frame and said proximate projection against a shoulder of said beating member, to a second position against said beating member which secures the bottom edge of said proximate projection of each lens against the top edge of said inverted generally U-shaped member.

* * * * *

UNITED STATES PATENT AND TRADEMARK OFFICE
CERTIFICATE OF CORRECTION

PATENT NO. : 5,467,148
DATED : November 14, 1995
INVENTOR(S) : Simon M. Conway

It is certified that error appears in the above-indentified patent and that said Letters Patent is hereby corrected as shown below:

In Column 5, line 58, delete the word "frame".

In Column 6, line 62, insert the word ---a--- after "on".

Signed and Sealed this

Thirteenth Day of August, 1996

*Attest:*

BRUCE LEHMAN

*Attesting Officer*         *Commissioner of Patents and Trademarks*